United States Patent
Heil et al.

(10) Patent No.: US 12,496,812 B2
(45) Date of Patent: Dec. 16, 2025

(54) VISIBLE PART HAVING A LAYER STRUCTURE FOR AN OPERATING PART OR A DECORATIVE TRIM WITH BETTER PROTECTION AS A RESULT OF A PROTECTIVE PAINT COATING

(71) Applicant: Preh GmbH, Bad Neustadt a.d. Saale (DE)

(72) Inventors: Hans-Karl Heil, Wildflecken (DE);
Dieter Gottwalt, Oberstreu (DE);
Holger Steinmüller, Unsleben (DE);
Andre Kessler, Poppenlauer (DE);
Martin Sünnemann, Höchheim (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 153 days.

(21) Appl. No.: 17/754,325

(22) PCT Filed: Jun. 30, 2021

(86) PCT No.: PCT/EP2021/068073
§ 371 (c)(1),
(2) Date: Mar. 30, 2022

(87) PCT Pub. No.: WO2022/008324
PCT Pub. Date: Jan. 13, 2022

(65) Prior Publication Data
US 2023/0182452 A1 Jun. 15, 2023

(30) Foreign Application Priority Data

Jul. 10, 2020 (DE) .......................... 102020004172.8
Aug. 17, 2020 (DE) .......................... 102020121563.0

(51) Int. Cl.
*B32B 27/08* (2006.01)
*B32B 3/04* (2006.01)
(Continued)

(52) U.S. Cl.
CPC ............... *B32B 27/08* (2013.01); *B32B 3/04* (2013.01); *B32B 3/30* (2013.01); *B32B 27/32* (2013.01);
(Continued)

(58) Field of Classification Search
CPC . B32B 3/30; B32B 2605/00; B32B 2605/003; B32B 2605/08; B32B 2451/00;
(Continued)

(56) References Cited

U.S. PATENT DOCUMENTS

| | | | |
|---|---|---|---|
| 5,915,780 A * | 6/1999 | Kobrehel | B60J 10/70 52/208 |
| 2019/0031118 A1* | 1/2019 | Sanahuja Clot | B60R 19/52 |
| 2019/0322810 A1* | 10/2019 | Deddo | C08K 3/04 |

FOREIGN PATENT DOCUMENTS

| | | |
|---|---|---|
| DE | 102010033206 A1 | 2/2012 |
| DE | 102017120152 A1 | 3/2019 |

(Continued)

OTHER PUBLICATIONS

English Language Translation of EP-3573043-A2 (Year: 2019).*
(Continued)

*Primary Examiner* — Maria V Ewald
*Assistant Examiner* — Daniel P Dillon
(74) *Attorney, Agent, or Firm* — M&B IP Analysts, LLC (57) ABSTRACT

The present disclosure relates to a visible part for an operating part or decorative panel, in particular for use in a motor vehicle, including a layer structure with the following layer sequence of layers while forming interfaces: a lower substrate layer; a decorative layer; an upper cover layer, wherein the upper cover layer is any one of: translucent and transparent; wherein the layer structure forms an end face into which an access to at least one interface enters, and wherein the substrate layer forms a projection with respect
(Continued)

to the upper cover layer of the layer structure; wherein the visible part furthermore has an upper transparent protective paint layer, which covers the cover layer and the end face and which, if the visible part is attached as intended, forms a top surface facing towards an observer and covers the access; as well as to an associated manufacturing method.

20 Claims, 4 Drawing Sheets

(51) Int. Cl.
| | | |
|---|---|---|
| *B32B 3/30* | (2006.01) | |
| *B32B 27/32* | (2006.01) | |
| *B32B 27/36* | (2006.01) | |
| *B60K 35/50* | (2024.01) | |
| *B60R 13/02* | (2006.01) | |

(52) U.S. Cl.
CPC ............ *B32B 27/365* (2013.01); *B60K 35/50* (2024.01); *B60R 13/02* (2013.01); *B32B 2250/24* (2013.01); *B32B 2255/10* (2013.01); *B32B 2255/26* (2013.01); *B32B 2307/41* (2013.01); *B32B 2307/412* (2013.01); *B32B 2307/414* (2013.01); *B32B 2451/00* (2013.01); *B32B 2605/00* (2013.01)

(58) Field of Classification Search
CPC . B32B 27/08; B32B 2250/03; B32B 2250/24; B60K 37/04; B60K 37/06; B60K 2370/339; B60K 2370/654; B60K 2370/688; B60K 35/00; B60R 13/02; B60R 13/005; B60R 13/00
See application file for complete search history.

(56) References Cited

FOREIGN PATENT DOCUMENTS

| | | | |
|---|---|---|---|
| DE | 102018124891 A1 | 4/2020 | |
| EP | 3573043 A2 * | 11/2019 | ......... B29C 45/1418 |
| WO | 2017121516 A1 | 7/2017 | |
| WO | WO-2020020547 A1 * | 1/2020 | ............ B32B 15/06 |
| WO | 2022008324 A1 | 1/2022 | |

OTHER PUBLICATIONS

English Language Translation of WO-2020020547-A1 (Year: 2020).*
International Search Report of International Searching Authority for PCT/EP2021/068073, ISA/EP, Rijswijk, Netherlands, Dated: Oct. 6, 2021.
Written Opinion of International Searching Authority for PCT/EP2021/068073, ISA/EP, Rijswijk, Netherlands, Dated: Oct. 6, 2021.

* cited by examiner

VISIBLE PART HAVING A LAYER STRUCTURE FOR AN OPERATING PART OR A DECORATIVE TRIM WITH BETTER PROTECTION AS A RESULT OF A PROTECTIVE PAINT COATING

The present disclosure relates to a visible part for an operating part or decorative panel, wherein the visible part has a layer structure. This is, for example, a plastic panel, particularly a plastic panel for an operating part. Further, the present disclosure relates to a method for producing such a visible part. Visible parts for an operating part or decorative panel, in particular for use in a motor vehicle, such as in the motor vehicle interior, generally have in each case a layer structure including a transparent or translucent cover layer, a substrate layer and a decorative layer disposed between the cover layer and the substrate layer. Usually, the purpose of the cover layer is not only to protect the decorative layer against damage, e.g. in combination with a protective paint layer, but also to provide the layer structure with an "optical depth", which makes the operating part or the decorative panel visually attractive and comes close to the optical impression as it is obtained using a glass material. However, the latter is not used because of the possibility of injury if it is broken. Thus, such layer structures are generally realized by plastic layers connected by substance-to-substance connection, e.g. by film back-molding, wherein the film forms a layer of the layer structure. These layer structures are problematic in that a detachment of the layers or a formation of cracks occurs particularly at the end faces of the layer structure, i.e. at the edges of the layer structure. The crack formation may result, on the one hand, from internal tensions in the individual layers introduced into the layer structure by the manufacturing process, for example, but also be accelerated by external influences, such as temperature fluctuations in the vehicle interior, or by the effect of solvents from chemical detergents. Due to the transparency of the top cover layer facing towards the operator, such visual impairments are visible to the operator and are perceived as an impairment of quality.

Against this background, there was a demand for a type-conforming visible part in which an improved protection and/or mechanical stabilization of the layer structure associated with the visible part is obtained. This object is achieved with a visible part according to claim 1. An equally advantageous production method is the subject matter of the independent claim. Advantageous embodiments are in each case the subject matter of the dependent claims. It must be noted that the features cited individually in the claims can be combined with each other in any technologically meaningful manner and represent other embodiments of the present disclosure. The description, in particular in connection with the figures, additionally characterizes and specifies the present disclosure.

The visible part according to the disclosed embodiments are intended for an operating part or decorative panel, particularly for use in a motor vehicle, e.g. for arrangement in the passenger compartment. The visible part according to the disclosed embodiment have a layer structure with the subsequently cited layer sequence of layers, wherein the layers, amongst each other, each have at least one interface with one of the other remaining layers. The layer structure has a lower, preferably opaque, substrate layer. "Lower" denotes an arrangement of the substrate layer which, given an arrangement of the visible part as intended, results from the orientation of the layer structure relative to the operator or observer, so that "lower" or "underneath" only means an arrangement of the respective layer, in this case the substrate layer, which is distant or facing away from the operator as compared with the remaining layers. In other words, the term "lower" is not supposed to imply an arrangement or orientation relative to the field of gravity but merely relate to the arrangement from the point of view of the operator or observer. The layer structure further comprises a decorative layer and an upper translucent or transparent cover layer. For example, the decorative layer is disposed between the substrate layer and the cover layer, wherein the decorative layer, with the side thereof facing away from the operator, is adjacent to the substrate layer disposed thereunder, and, with the side thereof facing towards the operator, is adjacent to the cover layer disposed above it, in each case forming an interface. Preferably, the layers of the layer structure are connected by substance-to-substance connection.

In this case, the layer structure has an end face into which an access to at least one of the interfaces enters. In other words, the access to at least one of the interfaces, e.g. between the cover layer and the decorative layer, and/or between the substrate layer and the decorative layer, and/or, if provided, between the cover layer and the substrate layer, is opened up at the end face. According to the present disclosure, the substrate layer forms a projection with respect to the upper layers of the layer structure, i.e. the substrate layer forms a pedestal-shaped protrusion at the end face of the layer structure. An end face of the layer structure is understood to be a surface connecting the two parallel, opposite main surfaces and forming common edges with them in each case, at the boundary of the layer structure.

According to the present disclosure, the visible part furthermore has an upper transparent protective paint layer, which covers the cover layer and the end face completely or partially and which, if the visible part is attached as intended, forms a top surface, also referred to as visible surface, facing towards the observer. According to the present disclosure, this protective paint layer covers the access to the at least one interface. Because the protective paint layer covers the access, a stabilization and seal of the layer structure in the region of the interface is obtained. The entry of liquids or foreign objects is avoided. The protruding substrate layer in this case provides a comparatively extensive adhesive surface for the protective paint layer, which in this case has an extent parallel to the main surfaces of the layer structure, and thus perpendicular to the stacking directions of the layer surface, which causes the protective paint layer to be comparatively securely adhered to the end faces of the layer structure. Moreover, the protective paint layer is usually applied in a flowable state, which, due to the wetting behavior with respect to the layers of the layer structure that are each formed from a thermoplastic material, for example, results in the covering paint layer forming, in the region above the access, where the projecting substrate surface is e.g. at right angles to the end faces of the remaining layers of the layer structure, a sealing strip, which is wedge-shaped in cross-section, extends along the end face and which is in short referred to as a wedge, whereby a particularly durable sealing effect and cover of the access is obtained.

Preferably, the decorative layer comprises a film, such as a polyethylene film or a polycarbonate film. More preferably, a decor is printed on at least one side of the film.

Preferably, the substrate layer is formed from a plastic, more preferably from a thermoplastic material.

Preferably, the cover layer is formed from a plastic, more preferably from a thermoplastic material.

Preferably, the layer structure is manufactured by a thermal molding method, more preferably a film back-molding method. Still more preferably, the film was back-molded in several successive steps on several sides during the film back-molding, in order to produce the layer structure.

Preferably, the protective paint layer is applied by spray application.

Preferably, the protective paint layer is configured in such a way, e.g. due to the selection of the wetting properties and/or the selection of the application of the protective paint, that a maximum layer thickness is formed in the region of the end face, preferably in the region of the access.

Preferably, the protective paint layer covers the entire end faces of the layer structure; for example, the end faces of the substrate layer, the decorative layer and the cover layer are covered by the protective paint layer in order to seal the access in an air-tight and/or liquid-tight manner.

Preferably, the protective paint layer forms a wedge covering the access and resting on the projection of the substrate layer. This is achieved as follows, for example: The protective paint layer is usually applied in a flowable state, which, due to the wetting behavior with respect to the layers of the layer structure that are each formed from a thermoplastic material, for example, results in the covering paint layer forming, in the region above the access, where the projecting substrate surface is e.g. at right angles to the end faces of the remaining layers of the layer structure, a sealing strip above the access, which is wedge-shaped in cross-section and referred to as a wedge, whereby a particularly durable sealing effect and cover of the access is obtained.

Preferably, the sizing of the projection is adapted to the layer thickness of the decorative layer and/or the viscosity and/or the surface tension of the protective paint during the application of the protective paint layer.

Preferably, the size of the projection with respect to all remaining layers of the layer structure is no greater than 0.3 mm, preferably no greater than 0.2 mm.

The present disclosure further relates to a method for producing a visible part for an operating part or decorative panel, in particular for use in a motor vehicle, which comprises the following steps:

In a production step, a layer structure is produced with the following layer sequence of layers while forming interfaces between the layers: a lower, preferably opaque, substrate layer; an upper translucent or transparent cover layer; a decorative layer disposed between the substrate layer and the cover layer. "Lower" denotes an arrangement of the substrate layer which, given an arrangement of the visible part as intended, results from the orientation of the layer structure relative to the operator or observer, so that "lower" or "underneath" only means an arrangement of the respective layer, in this case the substrate layer, which is distant or facing away from the operator as compared with the remaining layers. In other words, the term "lower" is not supposed to imply an arrangement or orientation relative to the field of gravity but merely relate to the arrangement from the point of view of the operator or observer. The layer structure further comprises a decorative layer and an upper translucent or transparent cover layer. For example, the decorative layer is disposed between the substrate layer and the cover layer, wherein the decorative layer, with the side thereof facing away from the operator, is adjacent to the substrate layer disposed thereunder, and, with the side thereof facing towards the operator, is adjacent to the cover layer disposed above it, in each case forming an interface.

According to the present disclosure, the layer structure has an end face into which an access to at least one of the interfaces enters. In other words, the access to at least one of the interfaces, e.g. between the cover layer and the decorative layer, and/or between the substrate layer and the decorative layer, and/or, if provided, between the cover layer and the substrate layer, is opened up at the end face.

According to the present disclosure, the substrate layer forms a projection with respect to the upper layers of the layer structure, i.e. the substrate layer forms a pedestal-shaped protrusion at the end face of the layer structure. An end face of the layer structure is understood to be a surface connecting the two parallel, opposite main surfaces and forming common edges with them in each case, at the boundary of the layer structure.

According to the present disclosure, the production step is followed by an application step, in which an upper transparent protective paint layer, which covers the cover layer and the end face, is applied such that it forms a top surface facing towards the observer, if the visible part is attached as intended, and wherein the protective paint layer covers the access.

Because the protective paint layer covers the access, a stabilization and seal of the layer structure in the region of the interface is obtained. The entry of liquids or foreign objects is avoided. The protruding substrate layer in this case provides a comparatively extensive adhesive surface for the protective paint layer, which in this case has an extent parallel to the main surfaces of the layer structure, and thus perpendicular to the stacking directions of the layer surface, which causes the protective paint layer to be comparatively securely adhered to the end faces of the layer structure. Moreover, the protective paint layer is usually applied in a flowable state, which, due to the wetting behavior with respect to the layers of the layer structure that are each formed from a thermoplastic material, for example, results in the covering paint layer forming, in the region above the access, where the projecting substrate surface is e.g. at right angles to the end faces of the remaining layers of the layer structure, a sealing strip, which is wedge-shaped in cross-section, extends along the end face and which is in short referred to as a wedge, whereby a particularly durable sealing effect and cover of the access is obtained.

According to a preferred variant of the method, the decorative layer comprises a film, such as a polyethylene film or a polycarbonate film.

According to a preferred embodiment of the method, the substrate layer is formed from a plastic, more preferably from a thermoplastic material.

Preferably, the cover layer is formed from a plastic, preferably from a thermoplastic material.

According to a preferred variant of the method, the layer structure produced in the production step is manufactured by a thermal molding method, such as a film back-molding method. Still more preferably, the film is back-molded in several successive steps on several sides during the film back-molding.

According to a preferred embodiment, the protective paint layer is applied in the application step by spray application.

Preferably, the application step is configured in such a way, e.g. due to the selection of the wetting properties and/or the selection of the application of the protective paint, that a maximum layer thickness is formed in the region of the end face, preferably in the region of the access.

After the application in the application step, the protective paint layer preferably covers the entire end faces of the layer structure; for example, the end faces of the substrate layer, the decorative layer and the cover layer are covered by the protective paint layer in order to seal the access in an air-tight and/or liquid-tight manner.

A preferred variant of the present disclosure provides that, after the application in the application step, the protective paint layer forms a wedge covering the access and resting on the projection of the substrate layer. This is achieved as follows, for example: The protective paint layer is usually applied in a flowable state, which, due to the wetting behavior with respect to the layers of the layer structure that are each formed from a thermoplastic material, for example, results in the covering paint layer forming, in the region above the access, where the projecting substrate surface is e.g. at right angles to the end faces of the remaining layers of the layer structure, a sealing strip above the access, which is wedge-shaped in cross-section and referred to as a wedge, whereby a particularly durable sealing effect and cover of the access is obtained.

Preferably, the sizing of the projection is adapted to the layer thickness of the decorative layer and/or the viscosity and/or the surface tension of the protective paint during the application of the protective paint layer.

Preferably, the size of the projection of the substrate layer with respect to all remaining layers of the layer structure is no greater than 0.3 mm, preferably no greater than 0.2 mm.

The present disclosure is explained further with reference to the following Figures. The Figures are to be understood only as examples and represent a merely preferred embodiment. In the Figures.

Figure 1:
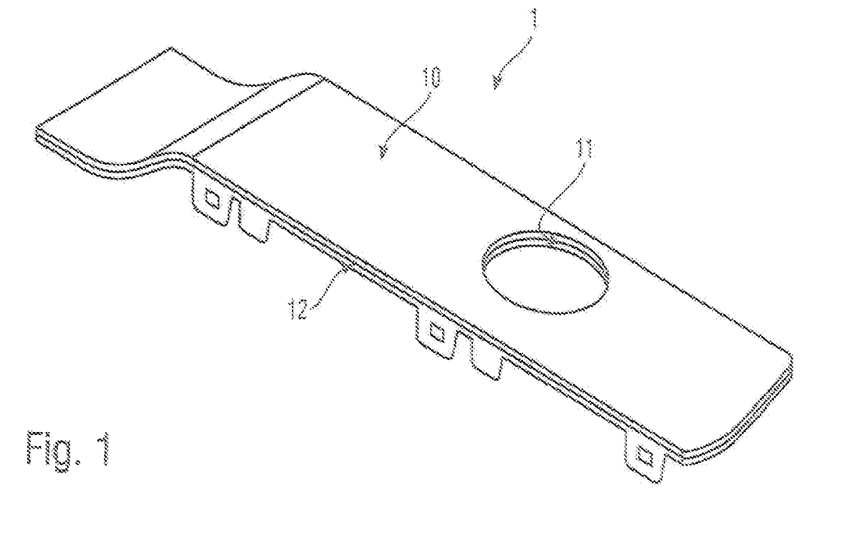
FIG. 1 shows a perspective view of an embodiment of the visible part 1 according to an embodiment, which is produced in accordance with the method according to an embodiment.

FIG. 1 shows the visible part 1 according to an embodiment in a perspective top view. The visible part 1 according to the embodiment is intended for an operating part or decorative panel, particularly for use in a motor vehicle, e.g. for arrangement in the passenger compartment, and therefore has a top surface 10, also referred to as visible surface, which faces towards the operator or user. On the side facing away from the top surface 10, the visible part has fastening means, such as latching lugs or latching recesses, for attachment to a support or vehicle component. The visible part 1 has a layer structure not illustrated in closer detail in the Figure, and a protective paint layer covering this layer structure. At the outer periphery of the top surface, 10, the visible part 1 forms a first end face 11 and, in each case at the edge delimiting a through-hole, a second end face 12. The disclosed embodiment substantially relates to the configuration of the layer structure and that of the protective paint layer in the region of the two end faces 11, 12. Hereinafter, the structure according to the embodiment is in each case described with respect to the first end face 11; however, the description equally applies to the second end face 12.

Figure 2:
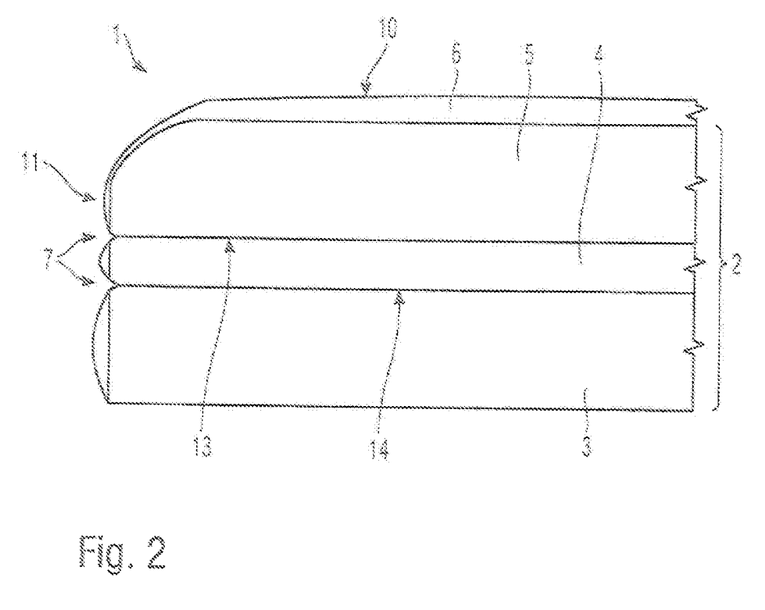
FIG. 2 shows a schematic partial cross sectional view of a visible part 1 according to the prior art.

First, the structure of a visible part 1 not in accordance with the embodiment is described hereinafter with reference to FIG. 2. The known visible part 1 according to the embodiment has a layer structure 2 with the subsequently cited layer sequence of layers 3, 4, 5, wherein the layers 3, 4, 5, amongst each other, each have at least one interface 13, 14 with one of the other remaining layers 3, 4, 5. The layer structure has a lower substrate layer 3. "Lower" denotes an arrangement of the substrate layer 3 which, given an arrangement of the visible part 1 as intended, results from the orientation of the layer structure 2 relative to the operator or observer, so that "lower" or "underneath" only means an arrangement of the substrate layer 3, which is distant or facing away from the operator as compared with the remaining layers 4, 5. The layer structure 1 further comprises a decorative layer 4 and an upper translucent or transparent cover layer 5. The decorative layer 4 is disposed between the substrate layer 3 and the cover layer 5, wherein the decorative layer 4, with the side thereof facing away from the operator, is adjacent to the substrate layer 3 disposed thereunder while forming a first common interface 14, and, with the side thereof facing towards the operator, is adjacent to the cover layer 5 disposed above it while forming a second common interface 13. The transparent cover layer 5 offers to the operator or observer an unimpeded view onto the decorative layer 4, which has a decor produced by printing, embossing and/or coating. In this case, the transparent cover layer 5 is supposed to generate an optical depth effect, similar to that of a layer including a glass material.

In this case, the layer structure 2 has a first end face 11 into which one access 7, respectively, to the first interface 14 or the second interface 13 enters. In other words, the access 7 to the first interface 14 between the substrate layer 3 and the decorative layer 4 and the access to the second interface 13 between the cover layer 5 and the decorative layer 4 are opened up at the end face 11. Though a transparent covering paint layer 6 is applied in the prior art solution by a spraying method in order to protect the surface of the cover layer 5, however, it does not form a continuous surface on the end face 11 due to the surface tension and/or the wetting properties of the materials used in the layer structure 2; rather, the accesses 7 to the interfaces 13, 14 remain open due to the thinning of the covering paint at the edges caused by surface tension, which is problematic, because foreign objects and liquids are able to enter, and a progressing, visually perceptible separation of the layers 3, 4, 5 at the interfaces 13, 14, which starts at the end surfaces 11, 12, may set in. Another problem results from the production method for such visible parts 1 that is usually employed: Generally, they are produced by a multi-step method, particularly a multi-step injection-molding method, particularly by back-molding a film on several sides. First, the film forming the decorative layer 4 is placed in a injection-molding tool and back-molded across the entire surface with a first transparent plastic, so that the transparent cover layer 5 is formed, which is connected with the decorative layer 4 by substance-to-substance connection. Then, the semi-finished visible part 1 is back-molded a second time with a second opaque plastic by means of another mold half in order to obtain the substrate layer 3, which is connected with the decorative layer 4 by substance-to-substance connection, or in a reversed order. Usually, the layer structure 2 is configured such that the respective layers 3, 4, 5 end flush (within the limits of the production tolerances) at the end faces 11, 12 connecting the main surfaces of the layer structure 2, i.e. lie in a common plane and thus result in a "smooth", "planar" end face 11, as FIG. 2 shows. In the manufacturing process described above, tensions arise within the visible part 1, which is problematic particularly in the case of larger elongated visible parts 1. "Bottlenecks" in the flow direction of the plastic compound and a curved geometry are further reinforcing factors for internal tension, because in these cases the work may requires a very high pressure and correspondingly large pressure differentials within the mold.

Figure 3:
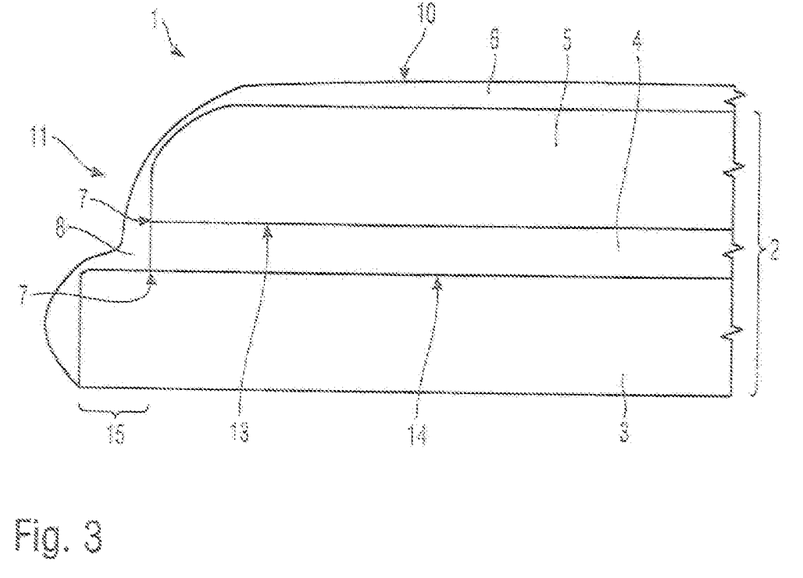
FIG. 3 shows a schematic partial cross sectional view of a visible part 1 according to a first embodiment of the present disclosure.
Figure 4:
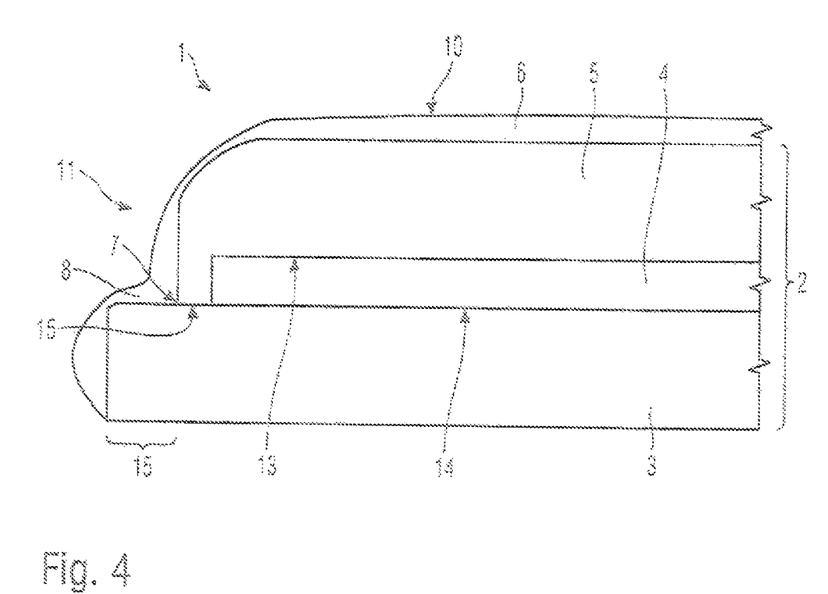
FIG. 4 shows a schematic partial cross sectional view of a visible part 1 according to a second embodiment of the present disclosure.

The tensions have an effect particularly in the region of the second interface 13 between the cover layer 5 and the decorative layer 4 and in the region of the first interface 14 between the decorative layer 4 and the substrate layer 3. If the tensions become too large in this area, the layers 3, 4, 5 become detached from one another while exhibiting stress corrosion. The flaws thus produced are visible to an observer through the transparent cover layer 5 and appear whitish. One reinforcing factor for stress corrosion is caused by the production process itself. By closing the mold prior to the second injection molding step, the internal tensions of the visible part 1 may be reinforced in the regions of the main surfaces of the layer structure 2. Due to inexact positioning (tolerances), pressure can be built up by the molding tool. Because stress corrosion can be formed due to the influence of solvent-containing foreign substances (e.g. suntan lotion, disinfectant) entering the interfaces 13, 14 between two respective layers 3, 4, 5 from the outside, it is the goal of the solution according to the embodiment to prevent them from entering. In order to protect the visible parts 1 comprising a layer structure 2 against the influence of these foreign substances, the protective paint forming the protective paint layer 6 needs to be applied in an improved manner, and the thinning of the protective paint at the edges caused by surface tension needs to be avoided; otherwise, there is no protection in the region of the access 7 to the interfaces 13, 14. As the FIGS. 3 and 4 show, the problem is solved by the substrate layer 3 forming a projection 15 with respect to the upper layers 4, 5 of the layer structure 2, i.e. by it projecting with a pedestal-shaped protrusion 15, and the covering paint layer 6 covering the accesses 7 or the access 7 to the interfaces 13, 14, 15. The thinning of the covering paint of the covering paint layer 6 at the edges is prevented by the projection 15.

A stabilization and seal of the layer structure 2 in the region of the interfaces 13, 14 is obtained by the protective paint layer 6 covering the accesses 7. The entry of liquids or foreign objects is avoided. The protruding substrate layer 3 in this case provides a comparatively extensive adhesive surface for the protective paint layer 6, which in this case has an extent parallel to the main surfaces of the layer structure 2, and thus perpendicular to the stacking directions of the layer surface, which causes the protective paint layer 6 to be comparatively securely adhered to the end faces 11, 12 of the layer structure 2. Moreover, the protective paint layer 6 is applied in a flowable state, e.g. by spray application, which, due to the wetting behavior with respect to the layers 3, 4, 5 of the layer structure 2 results in the covering paint layer 6 forming, in the region above the access or accesses 7, where the projecting surface of the substrate layer 3 is e.g. at right angles to the end faces of the remaining layers 4, 5 of the layer structure 2, a peripheral sealing strip, which is wedge-shaped in cross-section and referred to as a wedge 8, above the access or accesses 7, whereby a particularly durable sealing effect and cover of the access or accesses 7 is obtained.

However, the projection 15 is supposed to be as narrow as possible for reasons of appearance. The minimum possible width of the projection 15 results from the viscosity and surface tension of the covering paint of the covering paint layer 6 and the thickness of the decorative layer 4, e.g. of the film used for the decorative layer 4. It was found that, given a thickness of the decorative layer 4 of 0.5 mm at most, a projection 15 of the substrate layer 3 with respect to the upper layers 4, 5 of 0.2 mm is sufficient. Preferably, the following applies for the size of the projection 15 of the protrusion: half the thickness of the decorative layer<size of the projection<twice the thickness of the decorative layer. FIG. 4 shows a second embodiment which, due to tolerances, may also be realized in parallel with the first embodiment on one and the same visible part 1. In this case, the decorative layer 4 is minimally smaller, with regard to its surface extent, than the cover layer 5. In this case, the color of the substrate layer 3 should be chosen so as to be very similar to the color of the decor of the decorative layer 4; otherwise, this narrow rim is visible to the observer.

What is claimed is:

1. A visible part for an operating part or decorative panel, in particularly for use in a motor vehicle, comprising a layer structure with the following layer sequence of layers while forming interfaces:
   a lower substrate layer;
   a decorative layer having a thickness; and
   an upper cover layer, wherein the upper cover layer is any one of: translucent and transparent;
   wherein the layer structure forms an end face into which an access to at least one interface enters, and wherein the lower substrate layer forms a projection with respect to the decorative layer and the upper cover layer of the layer structure;
   wherein the visible part furthermore has an outer transparent protective paint layer, which covers the upper cover layer and the end face and which, if the visible part is attached as intended, forms a top surface facing towards an observer and covers the access;
   wherein the entirety of at least the end face of the layer structure is covered by the outer transparent protective paint layer to seal the access in at least one of: an air-tight and a liquid-tight manner;
   wherein the outer transparent protective paint layer forms a wedge covering the access and resting on the projection; and
   wherein a width size of the projection is within a range defined as follows: half the thickness of the decorative layer<width size of the projection<twice the thickness of the decorative layer.

2. The visible part according to claim 1, wherein the decorative layer comprises a film, wherein the film is any one of: a polyethylene film and a polycarbonate film.

3. The visible part according to claim 1, wherein the lower substrate layer is formed from a plastic.

4. The visible part according to claim 1, wherein the upper cover layer is formed from a plastic.

5. The visible part according to claim 1, wherein the layer structure is manufactured by a thermal molding method.

6. The visible part according to claim 1, wherein the protective paint layer is applied by spray application.

7. The visible part according to claim 1, wherein the protective paint layer has a maximum layer thickness in the region of the end face.

8. The visible part according to claim 1, wherein all end faces of the layer structure are covered by the protective paint layer to seal the access in at least one of: an air-tight and a liquid-tight manner.

9. The visible part according to claim 1, wherein a size of the projection is adapted to at least one of: a layer thickness of the decorative layer, a viscosity of a protective paint, and a surface tension of the protective paint during application of the protective paint layer.

10. The visible part according to claim 1, wherein a size of the projection is no greater than 0.3 mm.

11. The visible part according to claim 1, wherein the lower substrate layer is opaque.

12. The visible part according to claim 1, wherein the lower substrate layer and the upper cover layer are formed from thermoplastic materials.

13. The visible part according to claim 1, wherein the layer structure is manufactured by a film back-molding method.

14. The visible part according to claim 1, wherein the protective paint layer has a maximum layer thickness in the region of the access.

15. The visible part according to claim 1, wherein a size of the projection is no greater than 0.2 mm.

16. The visible part according to claim 1, wherein the protective paint layer is a continuous layer and has a maximum layer thickness in the region of the end face.

17. The visible part according to claim 1, wherein the outer transparent protective paint layer is a single layer of paint.

18. The visible part according to claim 1, where a surface of the projection on which the outer transparent protective paint layer rests is at right angles to the end face into which an access to at least one interface enters.

19. The visible part according to claim 1, wherein the outer transparent protective paint layer has a varying thickness.

20. The visible part according to claim 1, wherein the wedge has a coarsely approximate triangular shape.

* * * * *